United States Patent
Havermans et al.

(10) Patent No.: US 7,231,887 B2
(45) Date of Patent: Jun. 19, 2007

(54) MILKING INSTALLATION

(75) Inventors: Cornelis Christianus Franciscus Havermans, Zevenbergen (NL); Renatus Ignatius Joséphus Fransen, Vlaardingen (NL)

(73) Assignee: Lely Enterprises AG, Zug (CH)

( * ) Notice: Subject to any disclaimer, the term of this patent is extended or adjusted under 35 U.S.C. 154(b) by 0 days.

(21) Appl. No.: 10/879,360

(22) Filed: Jun. 30, 2004

(65) Prior Publication Data
US 2005/0000455 A1 Jan. 6, 2005

(30) Foreign Application Priority Data
Jul. 1, 2003 (NL) .................................... 1023791

(51) Int. Cl.
*A01J 3/00* (2006.01)
*A01J 5/00* (2006.01)

(52) U.S. Cl. ................... 119/14.14; 119/14.02; 119/14.01

(58) Field of Classification Search ............. 119/14.42, 119/14.14, 14.01, 14.02; 73/29.02, 335.01, 73/335.02, 335.06, 73; 374/16, 24, 27, 28; 165/230; 34/537
See application file for complete search history.

(56) References Cited

U.S. PATENT DOCUMENTS

| 3,689,907 | A | * | 9/1972 | Guajardo ................... 340/602 |
|---|---|---|---|---|
| 4,028,942 | A | * | 6/1977 | Gardiner ................. 73/335.02 |
| 4,579,462 | A | * | 4/1986 | Rall et al. ..................... 374/28 |
| 4,680,938 | A | * | 7/1987 | Caley ........................... 62/93 |
| 4,864,844 | A | * | 9/1989 | Moritz ....................... 73/29.03 |
| 4,877,329 | A | * | 10/1989 | Sauerbaum et al. .......... 374/28 |
| 5,069,160 | A | * | 12/1991 | Street et al. ............. 119/14.08 |
| 5,103,576 | A | * | 4/1992 | Cramer et al. ................ 34/549 |
| 5,113,655 | A | * | 5/1992 | Schumacher et al. ......... 60/408 |
| 5,257,008 | A | * | 10/1993 | Elamin ....................... 340/540 |
| 5,331,747 | A | * | 7/1994 | Stanton ....................... 34/405 |
| 5,454,256 | A | * | 10/1995 | Gimben et al. ............ 73/29.01 |
| 5,769,025 | A | * | 6/1998 | van der Lely et al. .... 119/14.42 |
| 5,957,081 | A | * | 9/1999 | van der Lely et al. .... 119/14.09 |
| 6,022,138 | A | * | 2/2000 | Sonander ..................... 374/28 |

(Continued)

FOREIGN PATENT DOCUMENTS

| EP | 1 081 445 A | 3/2001 |
|---|---|---|
| JP | 11 019460 A | 1/1999 |

OTHER PUBLICATIONS

EdgeTech, http://web.archive.org/web/20020722134407/http://www.w-dhave.inet.co.th/dewpoint2.html.*

(Continued)

*Primary Examiner*—Robert Swiatek
*Assistant Examiner*—Joshua Michener
(74) *Attorney, Agent, or Firm*—David P. Owen; Howney LLP

(57) ABSTRACT

A milking installation comprises a compressed air system with a compressed air line, a pneumatically controllable cylinder and a compressed air pump for supplying compressed air for the cylinder. The compressed air system comprises a dew point sensor for measuring the dew point of the compressed air and for emitting a dew point signal that is representative of the dew point. The milking installation may comprise or form part of a milking robot for automatically connecting teat cups to the teats of a dairy animal.

18 Claims, 1 Drawing Sheet

U.S. PATENT DOCUMENTS

| | | | | |
|---|---|---|---|---|
| 6,089,831 | A | * | 7/2000 | Bruehmann et al. ........ 417/282 |
| 6,155,098 | A | * | 12/2000 | Shapiro et al. ............ 73/29.01 |
| 6,257,169 | B1 | * | 7/2001 | Oosterling ............... 119/14.02 |
| 6,394,028 | B1 | * | 5/2002 | Birk ........................ 119/14.08 |
| 6,409,380 | B1 | * | 6/2002 | Fukuzono et al. ............ 374/28 |
| 6,553,942 | B1 | * | 4/2003 | Eriksson ..................... 119/670 |
| 6,587,642 | B1 | * | 7/2003 | King .......................... 392/364 |
| 6,767,390 | B2 | * | 7/2004 | Battershell et al. ........... 96/111 |

OTHER PUBLICATIONS

EdgeTech, http://web.archive.org/web/20030301014210/http://www.edgetech.com/mh_comair.htm.*

Heney P J : "Drying your compressed air system will save real money" Hydraulics and Pneumatics, Industrial Publishing Corp. Cleveland US Part 56, No. 3 Mar. 2003, pp. 32, 36, 38, 40, 41.

* cited by examiner

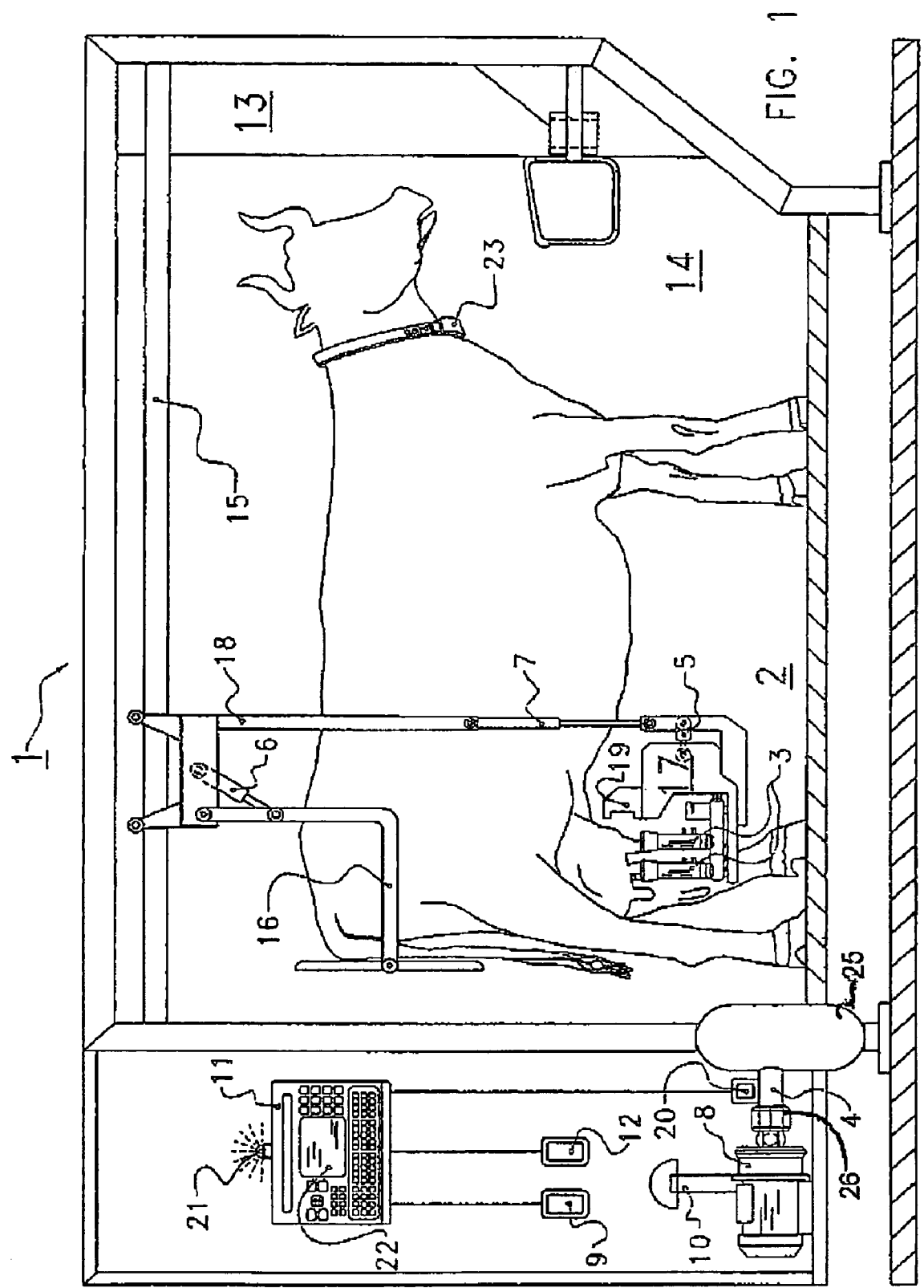

MILKING INSTALLATION

CROSS REFERENCE TO RELATED APPLICATIONS

This application claims priority from Netherlands application number 1023791 filed on 1 Jul. 2003, the contents of which are hereby incorporated by reference in their entirety.

BACKGROUND OF THE INVENTION

1. Field of the Invention

The invention relates to milking installation, in particular to milking installations having a milking robot for automatically connecting teat cups to the teats of a dairy animal. The invention also relates to methods of reducing condensation in such milking installations.

2. Description of the Related Art

Milking installations are known in which actuator devices are used to provide actuation of certain functions. These actuator devices may be in the form of vacuum cylinders operated by a vacuum supply and may be used for various functions including the opening of barriers and the retraction of teat cups. Such milking installations may be used in difficult and changeable environments such as in dairy parlors. Milking robots are also known which may provide substantially automatic connection of the teat cups to the teats of the animal. Such milking robots may comprise a compressed air system with a compressed air line, a pneumatically controllable cylinder and a compressed air pump for supplying compressed air for the cylinder. In contrast with conventional milking installations, milking installations provided with a milking robot are usually located in an environment with yet more difficult conditions, such as in the middle of a stable or cowshed. Strong temperature fluctuations are frequent here and in the winter large temperature variations may occur in such a stable or shed. In such cases, deposit of condensation may then take place in the compressed air system, in particular in the cylinders and valves for the control of the installation. Condensation occurs especially in those cases in which the pressure source is located in an environment having a higher temperature than the milking installation. Condensation is harmful to a cylinder and may lead to malfunctioning.

There is thus a need for a milking installation in which a compressed air system can provide actuation of certain functions of the installation while preventing or reducing the occurrence of condensation, especially within critical regions of the compressed air system.

BRIEF SUMMARY OF THE INVENTION

According to the present invention, there is provided a milking installation for milking a dairy animal, comprising a compressed air system for actuation of certain milking related functions, the compressed air system comprising a compressed air line, a pneumatically controllable cylinder, a compressed air pump for supplying compressed air for the cylinder and a dew point sensor. The dew point sensor measures the dew point of the compressed air and emits a dew point signal that is representative of the dew point.

By knowing the dew point it is possible to take measures, either automatically or not, in order to reduce or avert the occurrence of condensation. This makes it possible to prevent damage such that the milking installation and in particular the compressed air system can continue to function properly for a longer period of time.

Preferably, the milking installation comprises a milking robot for automatically connecting teat cups to the teats of a dairy animal. The compressed air system may in this case control some of the functions of the milking robot such as the positioning and removal of the teat cups.

According to a preferred embodiment the installation comprises a control unit for controlling the installation, while a control signal is emittable if the dew point is higher than a dew point limit. Preferably the control unit comprises a memory containing the dew point limit. Condensation only occurs in particular situations. By using a dew point limit as a criterion it is possible already to emit a control signal before condensation actually takes place.

According to another preferred embodiment the installation comprises a counter to emit a time signal to the control unit, while the control signal is emittable if during a specific time period the dew point is higher than the dew point limit. Often a little condensation is not harmful for the installation and action needs to be taken only in more prolonged cases of condensation.

In a favourable embodiment of the invention the milking installation comprises a temperature sensor for emitting a temperature signal that is representative of the temperature of the ambient air. The local temperature determines the occurrence of condensation. Condensation will take place sooner at a lower temperature than at a higher temperature.

The dew point limit preferably depends on the temperature signal. By automatically adapting the dew point limit to the temperature it is possible to act immediately in case of a temperature change. In particular towards the evening the temperature may fall quickly, so that conditions for condensation may occur more quickly.

It is advantageous if the control unit is suitable for emitting an alarm signal depending on the control signal. The alarm signal can alert an operator who can take adequate measures to prevent condensation or further condensation. The operator can for example put the milking installation out of operation or provide a less humid or warmer environment.

In one embodiment of the invention, viewed in a direction of flow of the compressed air, the compressed air line may comprise an after-cooling dryer located after the compressed air pump for further drying the compressed air. The after-cooling dryer may then be controllable by the control signal. By putting said after-cooling dryer into operation extra dry compressed air is created. In order to save energy said after-cooling dryer need only be put into operation if extra dry compressed air is desired.

In a further embodiment of the invention the compressed air line may comprise a condensation-catching element. By means of a condensation vessel it is possible to catch condensation and to prevent same from further penetrating into the compressed air system and from causing for example damage to the cylinders.

In again another embodiment of the invention the compressed air line may comprise a buffer vessel. By means of this it is possible to compensate for or reduce pressure fluctuations, which can increase the occurrence of condensation.

The invention also provides for a method of reducing condensation in a milking installation having a compressed air system comprising a compressed air line, a pneumatically controllable cylinder, a compressed air pump for supplying compressed air for the cylinder and a dew point sensor, the method comprising measuring the dew point of the compressed air, emitting a dew point signal that is representative of the dew point and emitting an alarm signal on the basis of the dew point signal.

BRIEF DESCRIPTION OF THE DRAWINGS

An embodiment of the invention will be described hereinafter by way of example only with reference to the drawing, in which:

FIG. 1 shows a milking installation according to an embodiment of the invention.

DESCRIPTION OF ILLUSTRATIVE EMBODIMENTS

FIG. 1 shows a milking installation 1 provided with a milking robot 2 for automatically connecting teat cups 3 to the teats of a dairy animal. Although in the following description, reference will be made to a milking installation comprising such a milking robot, it will be evident that the invention applies equally to milking installations without robotic connection of the teat cups.

The milking installation 1 comprises a compressed air system with a compressed air line 4, a pneumatically controllable cylinder 5, 6, 7 and a compressed air pump 8 for supplying compressed air for the cylinder 5, 6, 7. The compressed air system comprises a dew point sensor 20 for measuring the dew point of the compressed air and for emitting a dew point signal that is representative of the dew point. The milking installation 1 further comprises a box 13 with an animal area 14 for the dairy animal, in this case depicted as a cow. The animal area 14 is accessible via a pneumatically operable entrance door (not-shown) and also has such an exit door.

The milking robot 2 is movably suspended from a rail 15 of the box 13. By means of a so-called backside-follower 16 the milking robot 2 can detect the rear of the animal. The backside-follower 16 can be disposed against the rear of the animal by means of a pneumatic cylinder 6. At the bottom of the milking robot 2 there is located a unit 17 comprising the teat cups 3. The unit 17 is movable in height relative to the suspended arm 18 by means of cylinder 7 and is rotatable relative to the suspended arm 18 by means of the pneumatic cylinder 5. A detector in the form of a laser 19 is disposed on the unit 17 for the purpose of determining the position of the teats. All the pneumatic cylinders 5, 6, 7 can be controlled by the control unit 11 which is designed as a computer. All the pneumatic cylinders 5, 6, 7 constitute part of the compressed air system and are connected to the compressed air pump 8 via compressed air lines 4. The cylinders are activated in that valves in the lines to the cylinders 5, 6, 7 are electrically controlled by the control unit 11.

The compressed air pump 8 supplies a more constant pressure in the compressed air system. In a preferred embodiment the compressed air line comprises a buffer tank 25 immediately after the compressed air pump that serves to create a buffer of compressed air and to compensate for pressure fluctuations. In this embodiment there is also disposed a condensation-catching element for the buffer tank.

The milking installation 1 comprises a control unit for emitting a control signal to the compressed air pump 8 depending on the dew point signal. The dew point signal is generated by a dew point sensor 20 known per se. The compressed air pump 8 comprises an inlet 10 for receiving atmospheric air and an outlet connected to the compressed air line, the dew point sensor 20 being fastened near the outlet. However, the dew point sensor 20 need not necessarily be disposed in this place and there may also be disposed several dew point sensors. Besides, the milking installation 1 comprises a temperature sensor 12 for emitting a temperature signal that is representative of the temperature of the ambient air. The control unit is suitable for emitting an alarm signal in the form of an alarm light 21 and an indication on the computer screen 22. By means of said alarm signal the operator is alerted. Alternatively the operator can also be alerted telephonically in a known manner.

The milking installation 1 operates as follows.

Before the milking installation 1 is released for milking cows, the control unit first checks whether and how the compressed air system has to be set. To this end the dew point of the compressed air is determined by means of the dew point sensor 20. Then the temperature of the ambient air is determined. The dew point signal obtained from the dew point sensor 20 is expressed as a so-called dew point temperature. If the ambient temperature falls below said so-called dew point temperature, condensation occurs. A dew point limit is determined starting from the measured ambient temperature. Said limit may be equal to the ambient temperature but is preferably somewhat lower, so that an extra safety margin is incorporated. In a non-shown embodiment the dew point limit is fixed and is stored in the memory of the control unit 11 and can only be changed by the operator. If the dew point is higher than the dew point limit, the counter is activated. This counter is deactivated and set to zero when the dew point has decreased to below the dew point limit. In case the counter reaches a predetermined limit of e.g. 2 hours, a time signal is emitted to the control unit 11 and measures have to be taken. The alarm light 21 is activated and a warning becomes visible on the control screen 22. Additionally, the operator is automatically alerted by means of his telephone. If desired, even the entire milking installation 1 can be put out of operation. The milking installation 1 can also independently take measures in order to obviate the risk of condensation. To this end the compressed air pump 8 is controlled in order to increase the pressure of the compressed air. An after-cooling dryer 26 is also controlled for causing water vapor to condense additionally so that the dew point is decreased. Such an after-cooling dryer way be for example of the membrane type or the absorption type.

In a further embodiment (not-shown) an extra high pressure can be obtained within the compressed air system by also putting an additional second compressed air pump into operation. If, after having taken these measures, the dew point falls below the dew point limit, the milking installation 1 is released by the control unit 11 and the alarms are stopped.

If the installation has been released by the control unit 11, milking can take place. The procedure is as follows. A cow reports at the milking installation 1 and is identified by means of a transponder 23. After the control unit 11 has established that the specific animal should be milked, the control unit 11 opens the entrance door, so that the animal can enter the animal area 14. The entrance door is closed and then a cylinder is activated, so that the backside-follower 16 will be positioned against the rear of the animal. Then the arm is brought into the correct position under the udder by means of cylinders 5 and 7 and the teat position is determined by means of the laser 19, after which the teat cups are connected one by one to the teats. The control of the teat cups 3 for performing the milking process takes place in a known manner by means of a vacuum system (not shown).

Many modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A milking installation comprising:
    a milking robot for automatically connecting teat cups to teats of a dairy animal, the milking robot being located at a first location; and
    a compressed air system comprising:
       a compressed air line;
       a pneumatically controllable cylinder operatively connected to a part of the milking robot for connection of the teat cups;
       a source of compressed air having an inlet located at a second location remote from the first location for supplying compressed air for the cylinder;
       a temperature sensor emitting a temperature signal that is representative of the temperature of ambient air wherein a dew point limit depends on said temperature signal;
       a dew point sensor measuring a dew point of the compressed air and a emitting a dew point signal that is representative of the dew point;
       a control unit for controlling the installation wherein the control unit actively reduces the dew point in response to a control signal emitted when the dew point is higher than the dew point limit wherein the dew point is reduced by increasing pressure of the compressed air or operating a dryer to dry the compressed air.

2. A milking installation as claimed in claim 1 wherein the control unit comprises a memory containing the dew point limit.

3. A milking installation as claimed in claim 1, wherein the installation comprises a counter to emit a time signal to the control unit, and in that the control signal is emittable if during a specific time period the dew point is higher than the dew point limit.

4. A milking installation as claimed in claim 1, wherein the control unit is suitable for emitting an alarm signal depending on the control signal.

5. A milking installation as claimed in claim 1, wherein, viewed in a direction of flow of the compressed air, the compressed air line comprises after the compressed air pump an after-cooling dryer for further drying the compressed air, the after-cooling dryer being controllable by the control signal.

6. A milking installation as claimed in claim 1, wherein the compressed air line comprises a buffer vessel having a condensation catching element.

7. A milking installation comprising:
    a milking robot for automatically connecting teat cups to teats of a dairy animal, the milking robot being located at a first location; and
    a compressed air system comprising:
       a compressed air line;
       a pneumatically controllable cylinder operatively connected to a part of the milking robot for connection of the teat cups;
       a source of compressed air having an inlet located at a second location remote from the first location for supplying compressed air for the cylinder;
       a temperature sensor emitting a temperature signal that is representative of the temperature of ambient air wherein a dew point limit depends on said temperature signal;
       a dew point sensor measuring a dew point of the compressed air and a emitting a dew point signal that is representative of the dew point; and
       a counter emitting a time signal to a control unit the control unit emitting a control signal during a specific time period when the dew point is higher than the dew point limit, the dew point limit being determined to be equal to or lower than the temperature of the ambient air said control unit controlling the milking installation by actively emitting an alarm signal to an alarm depending on said control signal.

8. A milking installation as claimed in claim 7 wherein the control unit comprises a memory containing the dew point limit.

9. A milking installation as claimed in claim 7, wherein the control unit controls the installation in response to the control signal to reduce the dew point.

10. A milking installation as claimed in claim 7, wherein, viewed in a direction of flow of the compressed air, the compressed air line comprises after the compressed air pump an after-cooling dryer for further drying the compressed air, the after-cooling dryer being controllable by the control signal.

11. A milking installation as claimed in claim 7, wherein the control unit controls the installation to reduce the dew point by increasing a pressure of the compressed air.

12. A milking installation as claimed in claim 7, wherein the compressed air line comprises a buffer vessel having a condensation catching element.

13. A method of reducing condensation in an automatic milking installation comprising:
    providing the milking installation according to claim 1;
    measuring a dew point of the compressed air;
    emitting a dew point signal that is representative of the dew point emitting a control signal on the basis of the dew point signal; and
    reducing the dew point.

14. The method according to claim 13, further comprising reducing the dew point in response to the control signal by increasing a pressure of the compressed air.

15. The method according to claim 13, further comprising reducing the dew point in response to the control signal by operating a dryer to dry the compressed air.

16. A method of reducing condensation in an automatic milking installation comprising:
    providing the milking installation according to claim 7;
    measuring a dew point of the compressed air;
    emitting a dew point signal that is representative of the dew point emitting a control signal on the basis of the dew point signal; and
    reducing the dew point.

17. The method according to claim 16, further comprising reducing the dew point in response to the control signal by increasing a pressure of the compressed air.

18. The method according to claim 16, further comprising reducing the dew point in response to the control signal by operating a dryer to dry the compressed air.

* * * * *